(12) United States Patent
Takayama

(10) Patent No.: US 6,477,528 B1
(45) Date of Patent: Nov. 5, 2002

(54) FILE MANAGEMENT SYSTEM, ELECTRONIC FILING SYSTEM, HIERARCHICAL STRUCTURE DISPLAY METHOD OF FILE, COMPUTER READABLE RECORDING MEDIUM RECORDING PROGRAM IN WHICH FUNCTION THEREOF IS EXECUTABLE

(75) Inventor: Yoshifumi Takayama, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/386,376

(22) Filed: Aug. 31, 1999

(30) Foreign Application Priority Data

Jul. 29, 1999 (JP) .......................................... 11-215358

(51) Int. Cl.⁷ .............................................. G06F 17/30
(52) U.S. Cl. ............................ 707/5; 707/514; 345/775
(58) Field of Search ............................... 707/1–10, 526, 707/511, 506, 205, 103, 102, 513, 522, 200, 104.1; 345/351, 810, 764, 853, 775, 855; 704/9; 705/10.3, 6.3; 709/223, 217, 315

(56) References Cited

U.S. PATENT DOCUMENTS 5,581,752 A * 12/1996 Inoue et al. .................... 707/1
5,644,740 A    7/1997 Kiuchi ......................... 345/853
5,751,287 A * 5/1998 Hahn et al. ................... 345/351
5,761,655 A    6/1998 Hoffman ........................ 707/4
5,812,995 A * 9/1998 Sasaki et al. ................... 707/1
5,893,908 A * 4/1999 Cullen et al. ................... 707/5

FOREIGN PATENT DOCUMENTS

JP          6-36043       2/1994    ........... G06F/15/72
JP          6-176081      6/1994    ........... G06F/15/14
JP          6-337768      12/1994   ............ G06F/3/14

* cited by examiner

Primary Examiner—John Breene
Assistant Examiner—Mohammad Ali
(74) Attorney, Agent, or Firm—Finnegan, Henderson, Farabow, Garrett & Dunner, L.L.P.

(57) ABSTRACT

A file management system in a computer having a file system, which manages by a hierarchical management system, comprises file retrieval condition specifying means to specify file retrieval condition, file retrieval means to retrieve files based on a specified retrieval condition specified by the file retrieval condition specifying means, retrieval result display means to display a retrieval result of files by the file retrieval means, file selection means to select one file among files displayed by the retrieval result display means, and display means to display path information by which the storage position of the file selected by this file selection means is shown by the tree form.

6 Claims, 13 Drawing Sheets

PAGE MANAGEMENT TABLE

| | DOCUMENT | FOLDER | CABINET | | | KEY WORD | KEY WORD | REVISION | NUMBER OF REVISION PAGES | RELATIVE PATH | PAGE NUMBER |
|---|---|---|---|---|---|---|---|---|---|---|---|
| PAGE A | DOCUMENT A | FOLDER B | CABINET A | tif FILE | 1999/7/10 | KEY WORD A | KEY WORD B | REVISION PAGE EXIST | NUMBER OF REVISION PAGES 3 | RELATIVE PATH ¥~.tif | PAGE NUMBER 1 |
| PAGE B | DOCUMENT B | FOLDER B | CABINET A | txt FILE | 1999/1/10 | KEY WORD S | KEY WORD T | NO REVISION PAGE | NUMBER OF REVISION PAGES 0 | RELATIVE PATH ¥~.txt | PAGE NUMBER 3 |
| ----- | ----- | ----- | ----- | ----- | ----- | ----- | ----- | ----- | ----- | ----- | ----- |

FIG. 5A

DOCUMENT MANAGEMENT TABLE

| | | FOLDER | CABINET | | | KEY WORD | KEY WORD | REVISION | NUMBER OF PAGES | RELATIVE PATH |
|---|---|---|---|---|---|---|---|---|---|---|
| DOCUMENT A | | FOLDER B | CABINET A | | 1999/1/10 | KEY WORD D | KEY WORD E | PAGE EXIST | NUMBER OF PAGES 9 | RELATIVE PATH |
| DOCUMENT B | | FOLDER B | CABINET A | | 1999/1/10 | KEY WORD F | KEY WORD G | PAGE EXIST | NUMBER OF PAGES 2 | RELATIVE PATH |
| ----- | | ----- | ----- | | ----- | ----- | ----- | ----- | ----- | ----- |

FIG. 5B

FOLDER MANAGEMENT TABLE

| | | | | | | | | | |
|---|---|---|---|---|---|---|---|---|---|
| FOLDER A | | CABINET B | 1999/1/1 | | KEY WORD H | KEY WORD I | NO DOCUMENT | NUMBER OF DOCUMENTS 0 | RELATIVE PATH |
| FOLDER B | | CABINET A | 1999/1/2 | | KEY WORD J | KEY WORD K | DOCUMENT EXIST | NUMBER OF DOCUMENTS 5 | RELATIVE PATH |
| ----- | | ----- | ----- | | ----- | ----- | ----- | ----- | ----- |

FIG. 5C

DOCUMENT MANAGEMENT TABLE

| | | | | | | | |
|---|---|---|---|---|---|---|---|
| CABINET A | | 1998/12/10 | | FOLDER EXIST | NUMBER OF FOLDERS 3 | RELATIVE PATH |
| CABINET B | | 1998/12/15 | | FOLDER EXIST | NUMBER OF FOLDERS 5 | RELATIVE PATH |
| ----- | | ----- | | ----- | ----- | ----- |

FIG. 5D

```
┌─────────────────────────────────────────┐
│  DISPLAY TREE OF STORAGE PLACE OF FILE  │
│  WHEN RETRIEVAL RESULT IS DISPLAYED     │
└─────────────────────────────────────────┘
                    │
                    ▼                        S201
┌─────────────────────────────────────────┐
│                                         │
│     EXECUTE RETRIEVAL ACCORDING         │
│     TO RETRIEVAL CONDITION              │
│                                         │
└─────────────────────────────────────────┘
                    │
                    ▼                        S202
┌─────────────────────────────────────────┐
│                                         │
│     DISPLAY RESULT COINCIDE WITH        │
│     CONDITION IN RETRIEVAL RESULT LIST  │
│                                         │
└─────────────────────────────────────────┘
                    │
                    ▼                        S203
┌─────────────────────────────────────────┐
│     DISPLAY TREE OF STORAGE PLACE OF    │
│     PAGE SELECTED FROM RETRIEVAL        │
│     RESULT LIST REFERRING TO RELATIVE   │
│     PATH OF PAGE MANAGEMENT TABLE       │
└─────────────────────────────────────────┘
```

FIG. 9

FILE MANAGEMENT SYSTEM, ELECTRONIC FILING SYSTEM, HIERARCHICAL STRUCTURE DISPLAY METHOD OF FILE, COMPUTER READABLE RECORDING MEDIUM RECORDING PROGRAM IN WHICH FUNCTION THEREOF IS EXECUTABLE

BACKGROUND OF THE INVENTION

The present invention relates to a file management system and a hierarchical structure display method of file in a computer system, and especially, to a file management system, an electronic filing system, and a hierarchical structure display method of the file in a computer which manages a file by a hierarchical management system applied to these systems.

Generally, in the computer system such as personal computers, the file system, which is installed in the operating system, manages a produced file by a hierarchical structure. This manages by hierarchically providing a plurality of folders as a storage position of the files following the root directory, and storing the produced file in some folder.

On the other hand, the electronic filing system is used to record and manage a large amount of document, which lies scattered in the office, as electronic information. This electronic filing system stores and manages in a state of which the file is classified and arranged by reading the document recorded on paper as image data with a scanner etc., and storing it in the storage position where it is hierarchically installed as a file.

The cabinet (or, called as a library and a locker, etc.), the folder (or, called as a binder), and the document, etc. are used as a storage position of the file in this electronic filing system.

In the computer system such as personal computers, since there is no function to visually display the hierarchical structure of the file when the produced file is retrieved, it can not visually understand and confirm how many layers and which folders the retrieved file is stored, furthermore, where the file is located in the hierarchy of the system in which the folder storing the file is hierarchically managed, and, how the hierarchical structure of an upper folder of the folder is constructed.

Similarly, since the function to visually display the hierarchical structure of the storage position of the retrieved file in the electronic filing system is not installed, it is difficult to understand intuitively which document is stored in which folder of which cabinet is the retrieved file.

BRIEF SUMMARY OF THE INVENTION

An object of the present invention is to provide a file management system, an electronic filing system, a hierarchical structure display method of the file, and computer readable recording medium recording program in which function thereof is executable in the computer system which can visually and comprehensibly present the position where the file is stored for the user, when file, which is hierarchically stored, recorded and managed, is retrieved.

A file management system in a computer having a file system, which manages by a hierarchical management system, comprises: file retrieval condition specifying means to specify file retrieval condition; file retrieval means to retrieve files based on a specified retrieval condition specified by the file retrieval condition specifying means; retrieval result display means to display a retrieval result of files by the file retrieval means; file selection means to select one file among files displayed by the retrieval result display means; and display means to display path information by which the storage position of the file selected by this file selection means is shown by the tree form.

The position where the selected file is stored can be visually and comprehensibly presented for the user by the file system as a result of the retrieval of the file.

Moreover, an the electronic filing system, which manages files by a hierarchical management system, comprising: a database to manage storage position information which indicates the storage position of the file and retrieval information to retrieve the file; file retrieval condition specifying means to specify file retrieval condition; file retrieval means to retrieve files based on a specified retrieval condition; retrieval means to retrieve files which coincide with a retrieval condition specified by the file retrieval condition specifying means; retrieval result display means to display files retrieved by the retrieval means; file selection means to select one file among files displayed by the retrieval result display means; and display means to display a path information which indicates a storage position of the selected file by a tree form based on the storage position information on the file selected by the file selection means.

The position where the selected file is stored can be visually and comprehensibly presented for the user by the electronic filing system as a result of the retrieval of the file.

As mentioned above, presenting the storage position of the file for the user visually and comprehensibly becomes possible by displaying the hierarchical structure by which the storage position of the selected file from among the file displayed as a result of the retrieval is shown by the tree form, and the improvement of the operativeness of the file management system and the electronic filing system can be achieved according to the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A and 5D are figures which show the example of the configuration of the database used with the electronic filing system according to the first embodiment;

FIG. 9 is a flowchart which shows the procedure of the retrieval result tree display processing executed by the electronic filing system according to the first embodiment;

DETAILED DESCRIPTION OF THE INVENTION

Figure 1:
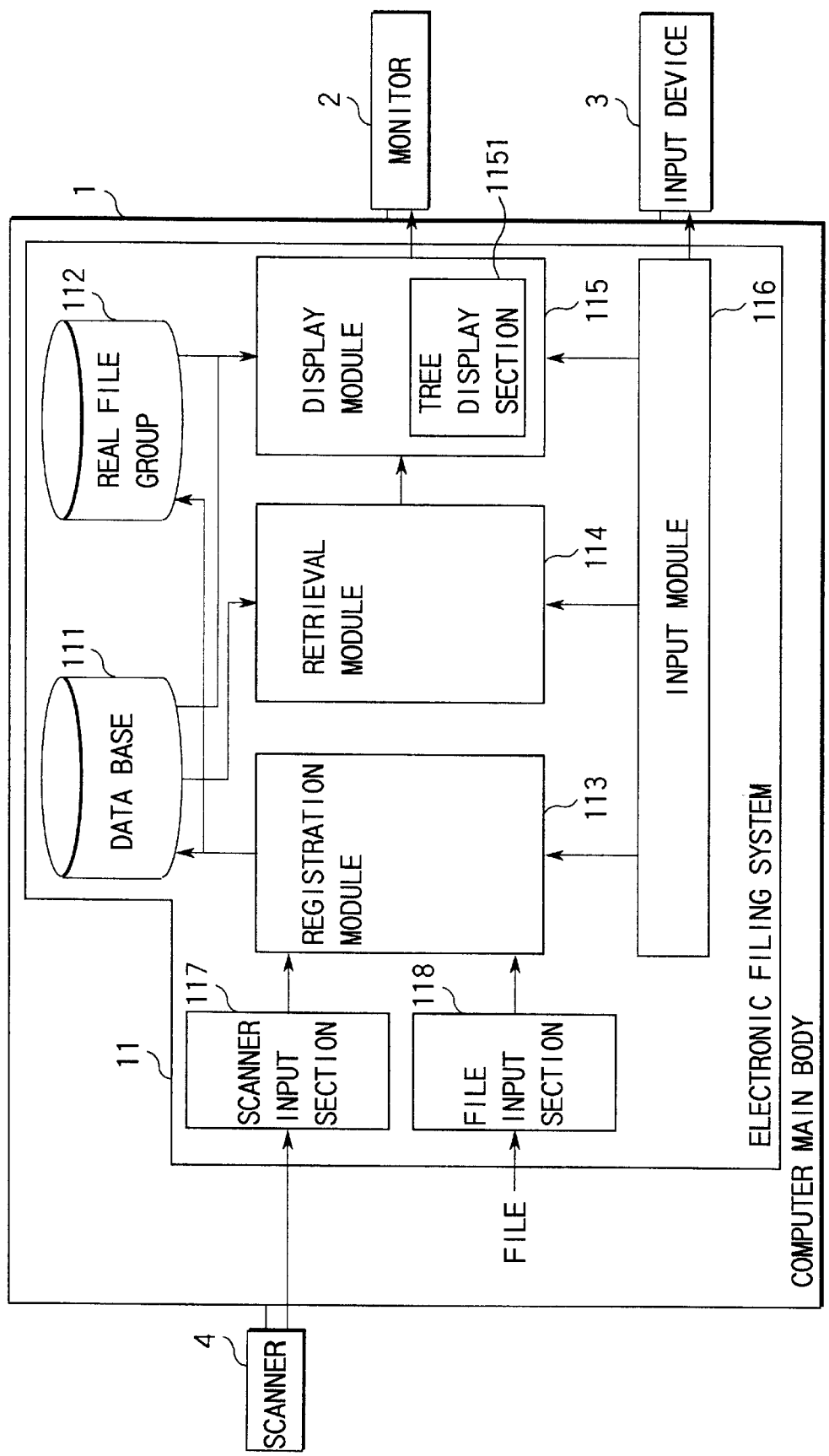
FIG. 1 is a block diagram which shows the function configuration of the electronic filing system according to the first embodiment of the present invention.

Hereafter, the embodiment of the present invention referring to the drawing will be explained.

The configuration of the electronic filing system according to the first embodiment of the present invention is shown in FIG. 1. This electronic filing system 11 manages document information in which the figure, the image, and the text, etc. are converted in electronic form, by a hierarchical management system of cabinet-folder-document-page-revision page, and is achieved as executable software in a usual computer system.

The computer system in which electronic filing system 11 is executed, is constructed by the computer main body 1, the display monitor 2, input device 3 such as the keyboard and the mouse, and scanners 4, etc. as shown in FIG. 1. The computer main body 1 is constructed by CPU and the hard disk drive as main memory and the secondary memory etc., and software, which constructs electronic filing system 11 is loaded on main memory as an application program, and executed by CPU.

Electronic filing system 11 of this embodiment is constructed by database 111, real file group 112, registration module 113, retrieval module 114, display module 115, input module 116, scanner input section 117, and file input section 118, etc. as shown in FIG. 1.

Database 111 stores the hierarchical structure management information to manage the document information by a hierarchical management system of cabinet-folder-document-page-revision page. This database 111 is constructed on the storage medium such as hard disk drives installed for example in the computer main body 1. Real file group 112 is a set of the real data registered to this electronic filing system 11. Real data is constructed by the image data file obtained by reading with scanner 4. Each file in real file group 112 is respectively managed by the unit of page. The page mentioned here is one file, and for example, one file among a plurality of drawing files (for example, file of the "**.tif" form) which is read with the scanner and one document file among a plurality of document files (for example, file of the "**.txt" form) are expressed as a page, respectively.

Registration module 113 is used to register real data to electronic filing system 11, and registers the image data file obtained by being read from scanner 4 to real file group 112. When real data is registered, registration module 113 registers the management information to database 111 so that the registered individual file is managed as a page. Reading the image data from scanner 4 is performed through scanner input section 117.

Retrieval module 114 retrieves the page, the document, and the folder which coincide with the retrieval condition input by the user by using retrieval information stored in database 111. Text information etc. to retrieve the page, that is, real data in all sentences in addition to title information as the key word added to the page, the document, and the folder respectively as tag are used as retrieval information. Information of the retrieval result is passed to display module 115, and is displayed on the screen if necessary.

Display module 115 is used to display the file operation screen of this electronic filing system on the monitor 2, and has tree display function to visually display hierarchical management system by tree form such as cabinet-folder-document-page-revision page. This tree display is performed according to the hierarchical structure management information of database 111, and can visually display not only the hierarchy to the cabinet-folder-document but also relationship to the page which exists in the document and page in the document by the tree form. Moreover, the relationship of the page and the revision page can be displayed by the tree form about the page where the revision page exists. In addition, the tree display to visually display the hierarchical structure of the storage position on the page is performed about the page retrieved by retrieval module 114.

Input module 116 is used to accept various operation instructions from the user, and various operation instructions such as registration, retrieval, and display, etc. are sent to the corresponding module.

HIERARCHICAL MANAGEMENT STRUCTURE OF ELECTRONIC FILING SYSTEM

Figure 2:
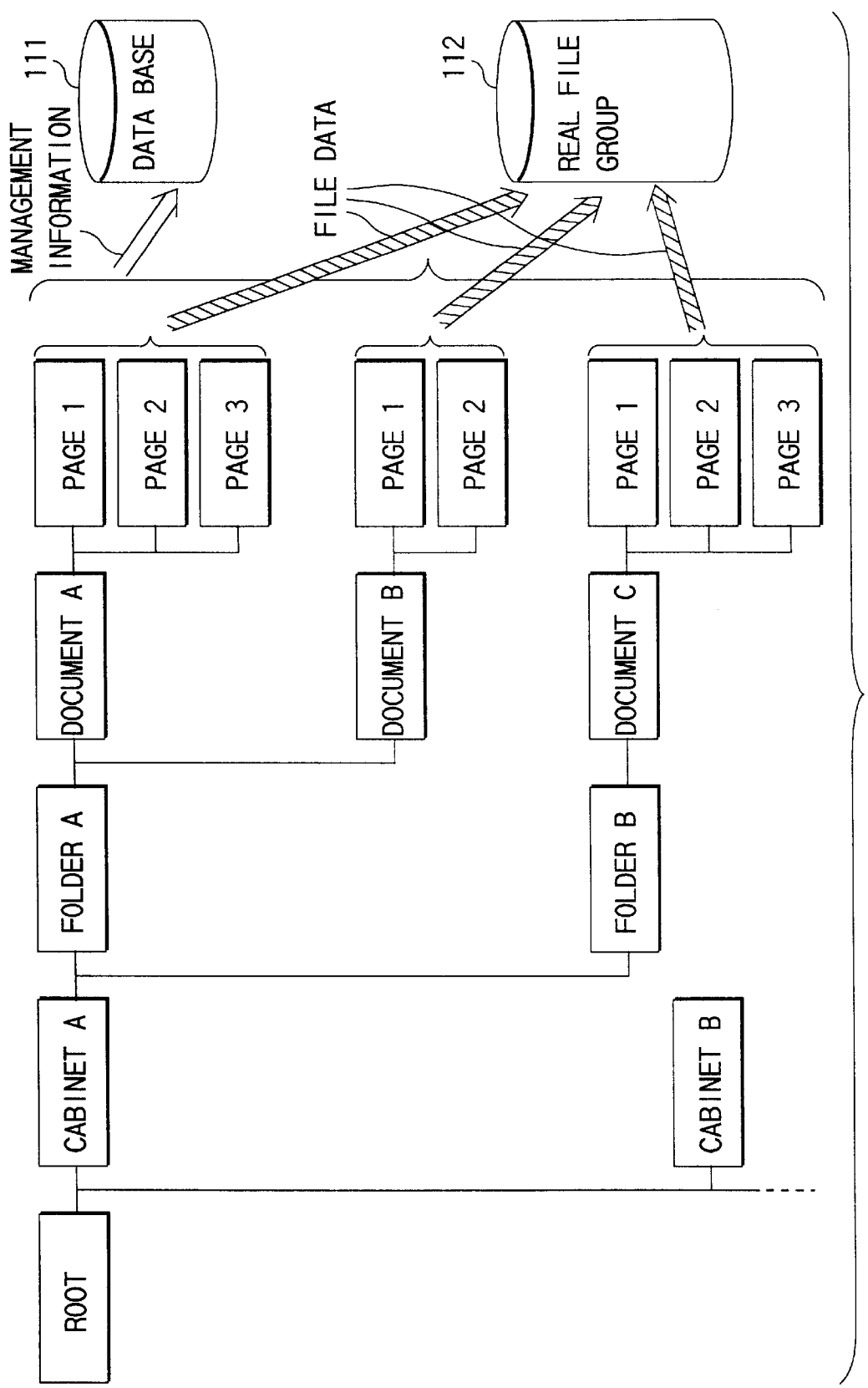
FIG. 2 is a figure to explain an example of the hierarchical structure used with the electronic filing system according to the first embodiment.

An example of the hierarchical structure used with this electronic filing system 11 is shown in FIG. 2. Document information is managed by the hierarchical structure of cabinet-folder-document-page-revision page in this electronic filing system 11 as mentioned above. "Page" corresponds to the file which is real data, and each file, which exists in real file group 112, is managed as a page.

The storage position to store the page is "Document". Therefore, storage position "Document" becomes one document information which is constructed from an individual page which exists there, that is, becomes a document which should be referred to the unit if it is seen from the user.

In FIG. 2, three documents of "Document A", "Document B", and "Document C" are produced as page storage position. "Document A" is constructed from three pages of page 1 to page 3, "Document B" is constructed from two pages of page 1 and page 2, and "Document C" is constructed from three pages of page 1 to page 3.

"Folder" is a storage position to classify and store a lot of "Document", and it may be called as "Binder". In this example, "Document C" is classified in "Folder B" and "Document A" and "Document B" are stored in "Folder A", respectively, among three documents of "Document A", "Document B", and "Document C". Storage position of these folders is "Cabinet" (or, called as a library and a locker, etc.). In this example, two cabinets of "Cabinet A" and "Cabinet B" are prepared in the root directory of electronic filing system 11, and "Folder A" and "Folder B" are stored in "Cabinet A".

The hierarchical structure management information to manage such management system exists in database 111, and real data corresponding to each page exists in real file group 112.

Since "Document" is a set of one or more pages, an appropriate name (document name) to each "Document" is added.

HIERARCHICAL STRUCTURE SEEN FROM FILE SYSTEM

Figure 3:
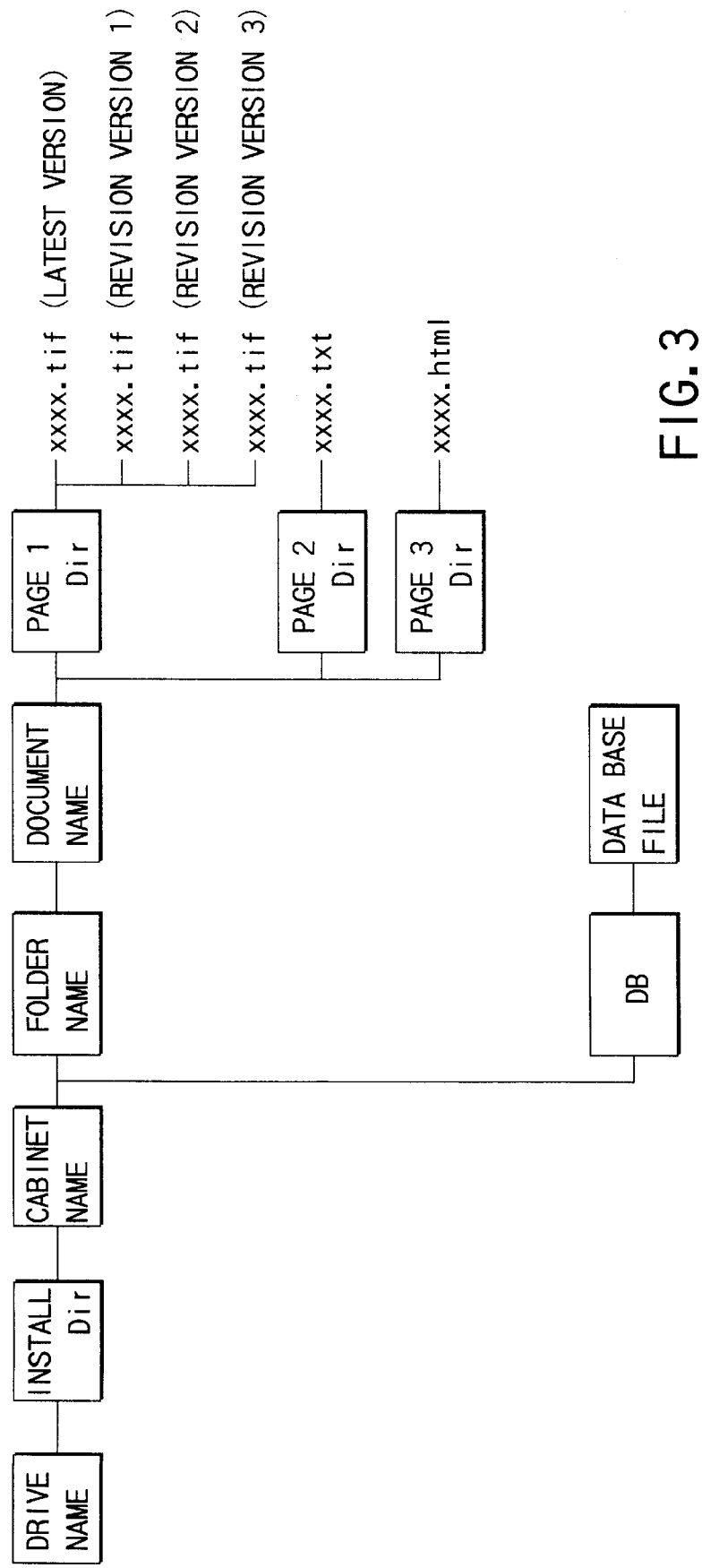
FIG. 3 is a figure which shows an actual directory configuration in the file system corresponding to the hierarchical structure of FIG. 2.

The actual directory configuration managed on the file system of the operating system is shown in FIG. 3. "Installation Dir" is a directory in which the software of electronic filing system 11 is installed, and this corresponds to the root directory of FIG. 2. The directory of "Cabinet" exists in the lower level of "Installation Dir", the directory of "Folder" exists in the lower level than that, and, in addition, the directory of "Document" exists in the further lower level. In directory "Document", page directory, which corresponds to the number of pages which constructs the "Document", exists. Three page directories of "Page 1 Dir", "Page 2 Dir", and "Page 3 Dir" are produced in directory "Document" when the document is constructed three pages from page 1 to 3 as shown in the figure.

The file of real data corresponding to the page is stored in each page directory. Only one file is stored in the page directory in which the page where the revision page does not exist. On the other hand, a file corresponding to each revision page and the file corresponding to the page of the latest version are stored in the page directory about the page where the revision page exists. In FIG. 3, "Page 1 Dir" is page directory including the revision page.

Moreover, the database file group is installed in directory "DB" installed in "Cabinet" directory, and corresponds to the hierarchical structure management information managed by database 111.

EXAMPLE OF HIERARCHICAL MANAGEMENT STRUCTURE OF ELECTRONIC FILING SYSTEM

Figure 4:
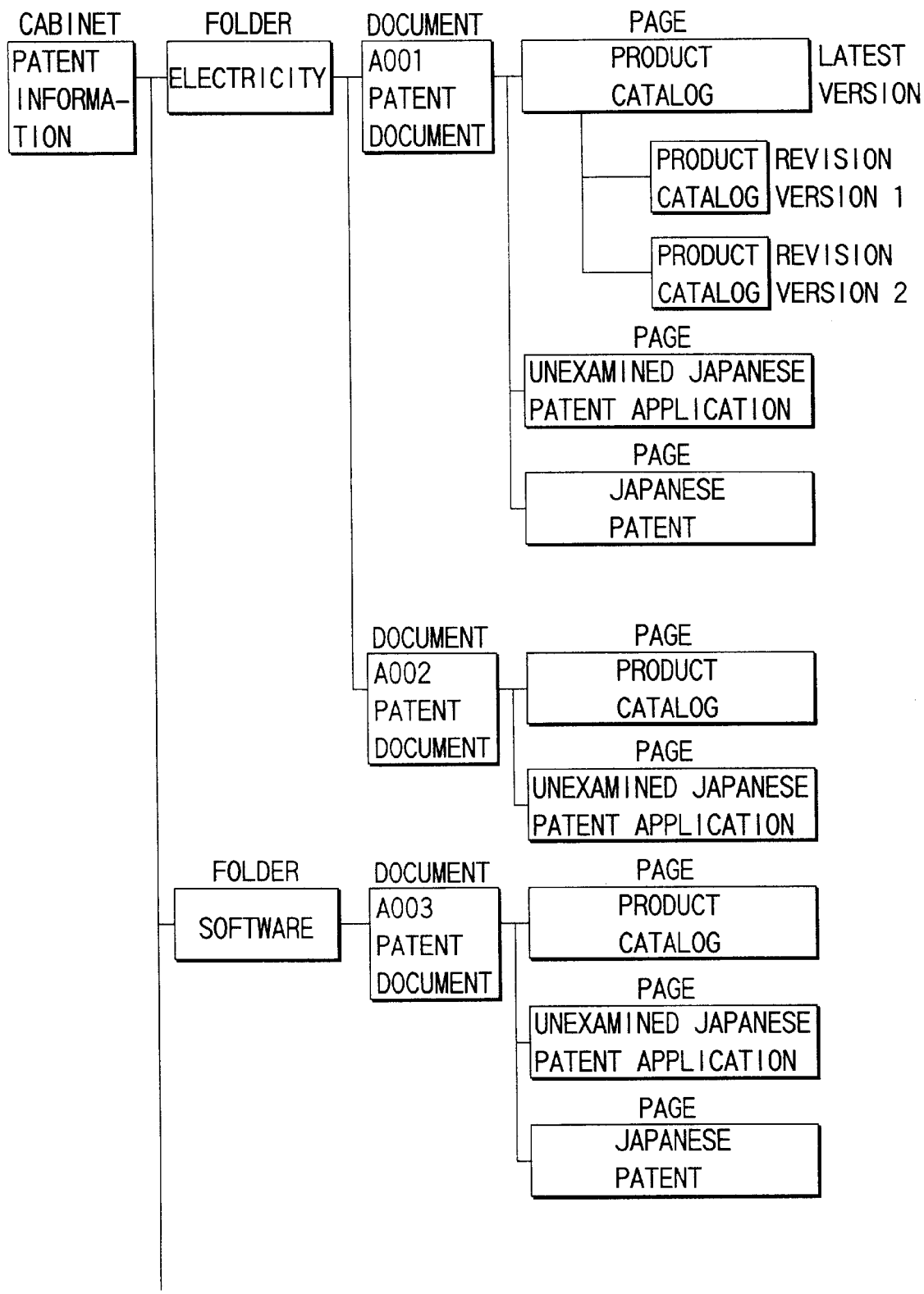
FIG. 4 is a figure which shows a specific use example of a hierarchical management system of cabinet-folder-document-page-revision page used with the electronic filing system according to the first embodiment.

A specific use example of a hierarchical management system of cabinet-folder-document-page-revision page is shown in FIG. 4. Here, the cabinet "Patent information" is prepared, and "Electricity" folder and "Software" folder are prepared as a folder for the document classification management. The document "A001 patent document" and "A002 patent document" is prepared in the "Electricity" folder, and files of the product catalog which publishes relating product information, the Unexamined Japanese patent application, and the Japanese Patent, etc. is registered in each document as a page. The latest version becomes a basic page when the revision version is produced by the file update etc. of the product catalog, and the old edition is managed as a revision version concerning the basic page.

Thus, since the management of the page is performed by "Document" which is the storage position of the page corresponding to real data, the registration of the page which is real data is always performed to "Document" in this electronic filing system.

DATABASE

An example of a specific data structure of the hierarchical structure management information of database 111 is shown in FIG. 5. The hierarchical structure management information is constructed by the page management table, the document management table, the folder management table, and the cabinet management table.

PAGE MANAGEMENT TABLE

Information group page management table is necessary for the hierarchical structure management on each page, and is constructed by the plurality of record group corresponding to each page of the management target as shown in FIG. 5A. "Page name field", "Document name field", "Folder name field", "Cabinet name field", "File type field", "Manufacturing day field", and 2 "Key word fields", "Revision page existence information field", "Revision page number field", "Path information field", and "Page number field", etc. are defined in each record.

"Page name field" is a field to register page name for page identification and sequential number is registered in "Page name field" for every page registration as page name. "Document name field", "Folder name field", and "Cabinet name field" are information to specify "Document", "Folder", and "Cabinet" of the upper level on the corresponding page, respectively. The form (extension) of the file corresponding to the corresponding page is registered in "File type field" and information on the file manufacturing day is registered in "Manufacturing day field". Two "Key word fields" are information used to retrieve the page, and two key words of each page can be defined.

"Revision page existence information field" is information which indicates presence of the revision page and "Revision page number field" is information which indicates the existing number of revision pages. "Path information field" is path information which indicates page storage position seen from the cabinet or the root, and is used when an actual file is accessed. "Page number field" indicates what number of pages the corresponding page is in the document.

DOCUMENT MANAGEMENT TABLE

The document management table is necessary information group for the hierarchical structure management of each document, and is constructed by the plurality of record group corresponding to each document of the management target as shown in FIG. 5B. "Document name field", "Folder name field", "Cabinet name field", "Manufacturing day field", and 2 "Key word fields", "Page existence information field", "Page number field", and "Path information field", etc. are defined in each record.

"Document name field" is a field which indicates the document name named to the corresponding document. "Folder name field" and "Cabinet name field" are information to specify "Folder" and "Cabinet" of the upper level of the corresponding document, respectively. Information on the document manufacturing day is registered in "Manufacturing day field". Two "Key word fields" are information used to retrieve the document, and two key words of each document can be defined. "Page existence information field" is information which indicates presence of the page and "Page number field" is information which indicates the number of pages which exists in the document. "Path information field" is path information which indicates the document storage position seen from the cabinet or the root.

FOLDER MANAGEMENT TABLE

The folder management table is necessary information group for the hierarchical structure management of each folder, and is constructed by the plurality of record group corresponding to each folder of the management target as shown in FIG. 5C. "Folder name field", "Cabinet name field", "Manufacturing day field", and 2 "Key word fields", "Document existence information field", "The number of documents field", and "Path information field", etc. are defined in each record.

"Folder name field" is a field which indicates the folder name named to the corresponding folder. "Cabinet name field" is information to specify "Cabinet" of the upper level of the corresponding document. Information on the folder manufacturing day is registered in "Manufacturing day field". Two "Key word fields" are information used to retrieve the folder, and two key words of each folder can be defined. "Document existence information field" is information which indicates the presence of the document and "The number of documents field" is information which indicates the number of documents which exists in the folder. "Path information field" is path information which indicates the position where the folder seen from the cabinet or the root is stored.

CABINET MANAGEMENT TABLE

The cabinet management table is necessary information group for the management of each cabinet, and is constructed by the plurality of record group corresponding to each cabinet of the management target as shown in FIG. 5D. "Cabinet name field", "Manufacturing day field", "Folder existence information field", "The number of folders field", and "Path information field", etc. are defined in each record.

"Cabinet name field" is a field which indicates the cabinet name named to the corresponding cabinet. Information on the cabinet manufacturing day is registered in "manufacturing day field". "Folder existence information field" is information which indicates the presence of the folder and "The number of folders field" is information which indicates the number of folders which exists in the cabinet. "Path information field" is path information which indicates the position where the cabinet seen from the root is stored.

TREE DISPLAY OF HIERARCHICAL STRUCTURE

Figure 6:
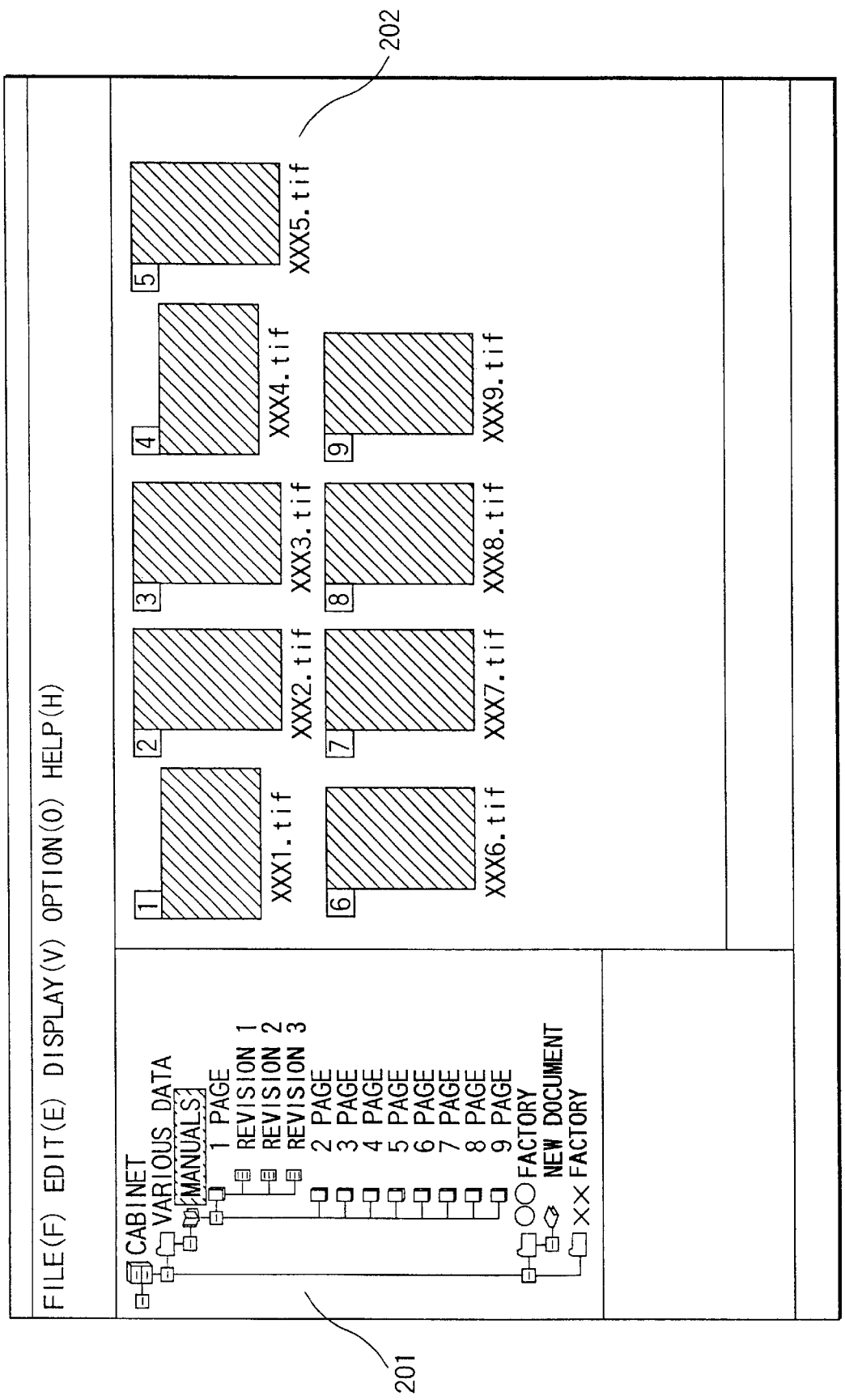
FIG. 6 is a figure which shows an example of the display screen used with the electronic filing system according to the first embodiment.
Figure 7:
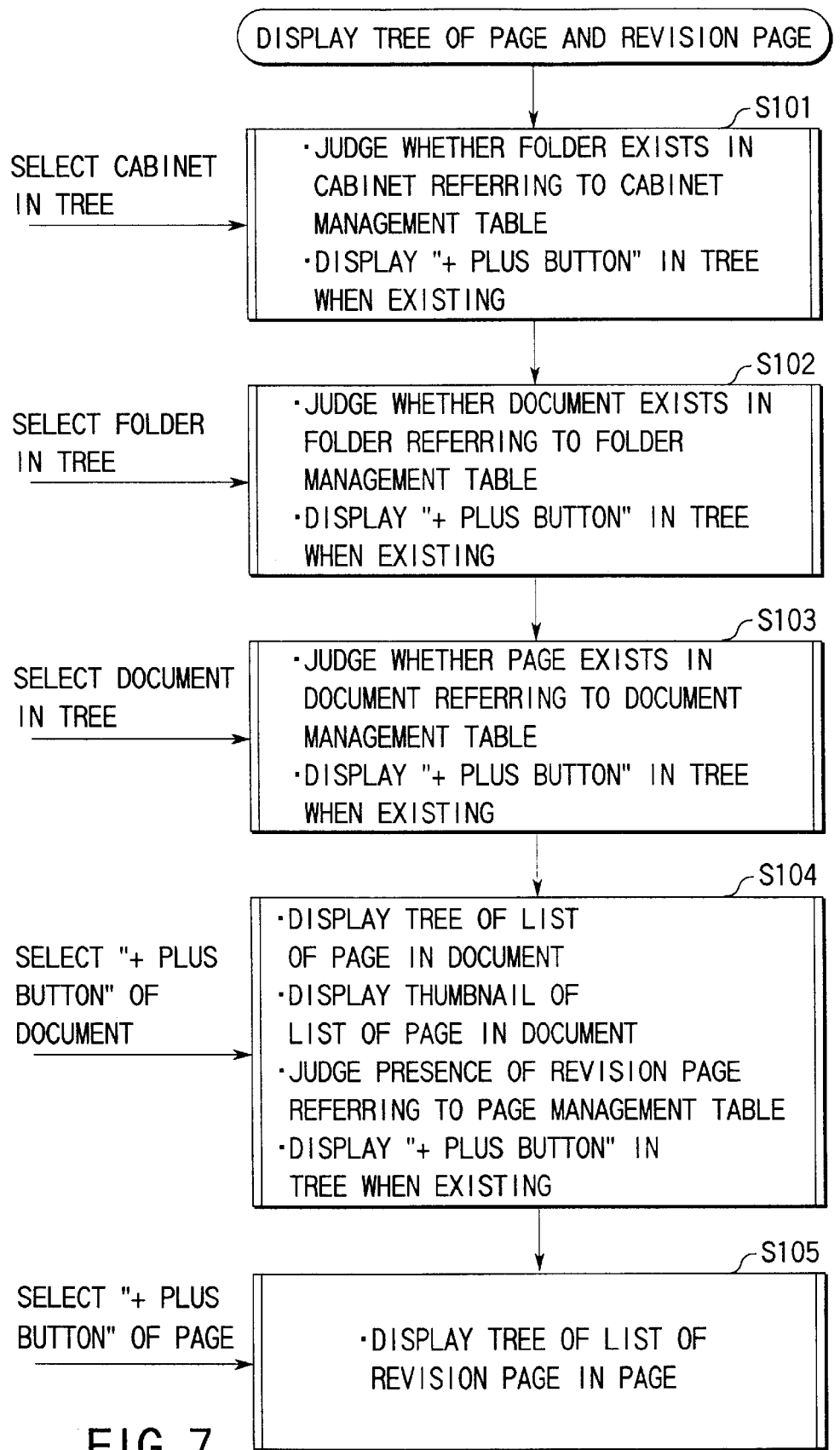
FIG. 7 is a flowchart by which the procedure of the tree display processing on the page and the revision page executed by the electronic filing system according to the first embodiment is shown.

Next, tree display of page and revision page referring to FIG. 6 and FIG. 7 will be explained. FIG. 6 is an operation screen to perform the file operation and the display, etc. and FIG. 7 is a flowchart which shows the processing procedure for the tree display.

Tree display area 201 and list display area 202 are installed on the screen of FIG. 6 as shown in the figure.

Tree display area 201 is a window to visually display the structure of a hierarchical management system of cabinet-folder-document-page-revision page by the tree form. "Various data" displayed in the lower level of "Cabinet" as a leaf of the tree, "○○ factory", and "X X factory" are folders for the document classification made in the cabinet "Cabinet". "Manual" displayed in the lower level of folder "Various data" as a leaf is a document which exists in folder "Various data". +plus button is displayed on the side of document "Manual" when nine pages exist in the document this "Manual", and when the user selects the +plus button, the tree display "first page" and "second page" . . . and "ninth page" are performed to the lower level of "Manual" as shown in the figure. Moreover, when three the revision pages exist concerning page 1, the display "Revision 1", "Revision 2", and "Revision 3" is performed to the lower level of the display item "first page" as shown in the figure. Thus, not only the hierarchy to the document but also the hierarchical structure to the page and the revision page of the lower level are visually displayed in tree display area 201 visually by the tree form.

List display area 202 is used to display the directory which exists in the leaf specified on tree display area 201, and when the user selects document "Manual", thumbnail is displayed to the reduction image of the file which corresponds to "first page" and "second page" . . . and "ninth page" respectively as shown in the figure. In this thumbnail display, only the reduction image of the head page is displayed about the file constructed from the plural pages. Moreover, an actual file name is displayed under each display image. The thumbnail display can be performed at high speed without accessing real data by producing beforehand and registering the reduction image in database 111 when the page is registered.

The display image (file name: xxx1.tif) corresponding to "first page" is a content of the latest version page. If "first page" is selected in tree display area 201, the image of a file revision page "Revision 1", "Revision 2", and "Revision 3" respectively can be displayed in list display area 202.

Hereinafter, processing procedure to display tree to page and revision page referring to flowchart of FIG. 7 will be explained.

STEP S101

The event which shows that "Cabinet" in tree display area 201 is selected by the user, is transferred to display module 115 via input module 116. In this case, display module 115 judges whether the folder exists in the cabinet referring to folder existence information defined in the cabinet management table of database 111. When the folder exists, display module 115 displays "+plus button" on the side of "Cabinet" on the tree. When this "+plus button" is selected by the user, display module 115 displays all folders which exist in "Cabinet" on the tree according to information of the number of folders on the cabinet management table. In this case, the folder name of the folder which makes selected "Cabinet" an upper level is detected by referring to the folder management table, and the folder name is displayed in each folder on the tree.

STEP S102

The event which shows that predetermined "Folder" in tree display area 201 is selected by the user, is transferred to display module 115 via input module 116. In this case, display module 115 judges whether the document exists in the folder referring to document existence information defined in the folder management table of database 111. When the document exists, display module 115 displays "+plus button" on the side of "Folder" on the tree. When this "+plus button" is selected by the user, display module 115 displays all documents which exist in "Folder" on the tree according to the number of documents information on the folder management table. In this case, the document name of the document which makes selected "Folder" an upper level is detected by referring to the document management table, and the document name is displayed in each document on the tree.

STEP S103

The event which shows that predetermined "Document" in tree display area 201 is selected by the user, is transferred to display module 115 via input module 116. In this case, display module 115 judges whether the page exists in the document referring to page existence information defined in the document management table of database 111. When the page exists, display module 115 displays "+plus button" on the side of "Document" on the tree.

STEP S104

When "+plus button" on the side of the document is selected by the user, display module 115 displays all pages which exist in "Document" on the tree according to page number information on the document management table. Thereafter, display module 115 judges whether the revision page exists on each page referring to revision page existence information on page management table. "+plus button" is displayed about the page where the revision page exists on the side of the corresponding page on the tree.

Moreover, when the document on the tree is selected, display module 115 examines the relative path on the page by which selected "Document" is made an upper level by referring to the document management table, and displays the reduction image corresponding to each page on list display area 202.

STEP S105

When "+plus button" on the page is selected by the user, display module 115 displays all the revision pages which exist in "Page" on the tree according to revision page number information on page management table.

TREE DISPLAY OF RETRIEVAL RESULT

Figure 8:
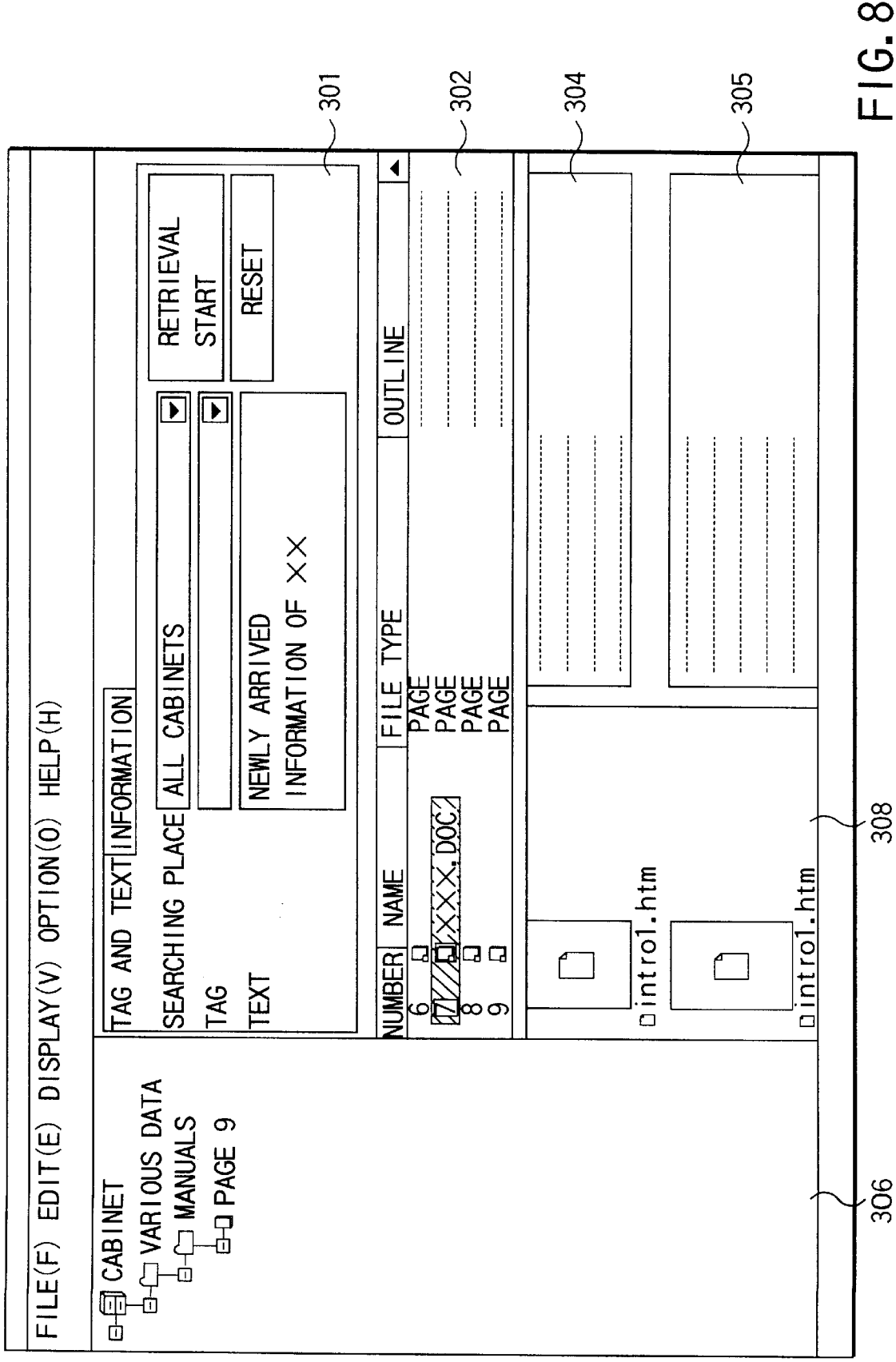
FIG. 8 is a figure which shows an example of the display screen used by the retrieval processing of the electronic filing system according to the first embodiment.

Next, a case of displaying the place of the retrieved page by tree display referring to FIG. 8 and FIG. 9 will be explained. FIG. 8 is a screen for the retrieval and FIG. 9 is a flowchart which shows the processing procedure to display the retrieval result in the tree.

Retrieval information input area 301, retrieval result list display area 302, icon display area 303, file view areas 304 and 305, and tree display area 306 are installed on the screen of FIG. 8 as shown in the figure.

Retrieval information input area 301 is a window to input the retrieval condition, and the retrieval of the page which coincides with the retrieval condition, the document, and the folder is started by inputting the character string which shows the retrieval condition in the key word (tag) and the text input field, and selecting "Retrieval starting" button. Retrieval result list display area 302 is a window to display the retrieved page, the document, and the folder, and the name of the retrieved page, the document, and each folder, file types, and outlines are displayed here as shown in the figure. The file name of real data corresponding to the page is displayed in the column of "Name" as shown in the figure when the page is retrieved, and "Page" is displayed in the column of "File type".

The content of the icon (or, thumbnail image of the reduction image) corresponding to the file type which corresponds to icon display area 303 and file view areas 304 and 305 respectively, and the file is displayed about two retrieval results displayed at the center in retrieval result list display area 302. Displayed information in file view areas 304 and 305 is text information for the display which is produced in database 111 when the page is registered etc.

Tree display area 306 is used to display the place of the retrieved data in the tree, and the place of the file selected in retrieval result list display area 302 is visually displayed by the tree form. For example, the page number (ninth page) on the selected page (file), the document name (manuals) where the pages exist, the folder name (various data) in which the documents exist and the cabinet name in which the folders exist are displayed in tree display area 306 by the tree form, when the retrieved page is selected in retrieval result list display area 302 (cabinet) as shown in the figure.

Hereinafter, processing procedure to retrieve real data referring to flowchart of FIG. 9, and to display the place of the retrieved data in tree will be explained.

STEP S201

The retrieval condition is input to retrieval information input area 301 and "retrieval start" button is pushed, retrieval module 114 retrieves real data which coincides with the input retrieval condition referring to, for example, key word information registered in each management table of database 111 in FIG. 5A to FIG. 5D etc., and the index of text information for the full-text search registered in database 111.

STEP S202

The retrieval result is passed from the retrieval module 114 to display module 115, and display module 115 displays the list of the retrieval result in retrieval result list display area 302 according to this.

STEP S203

When a specific page on retrieval result list display area 302 is selected, display module 115 displays the place (document, folder, and cabinet) on the page in tree display area 306 by the tree form referring to relative path information on the corresponding page registered in page management table.

If a computer readable storage medium, to which the computer program, which includes the processing procedure of electronic filing system 11 of this embodiment is recorded, is prepared, since all of electronic filing system 11 of this embodiment is achieved with software, the effect same as this embodiment can be achieved only by the introducing the computer program into a usual computer through the storage medium.

SECOND EMBODIMENT

Next, the second embodiment of present invention will be explained. The second embodiment retrieves the file to which the file system manages in the computer system, and is concerning the file management system which displays the hierarchical structure by which the storage position of the selected file is shown by the tree form from among the retrieved files.

Figure 10:
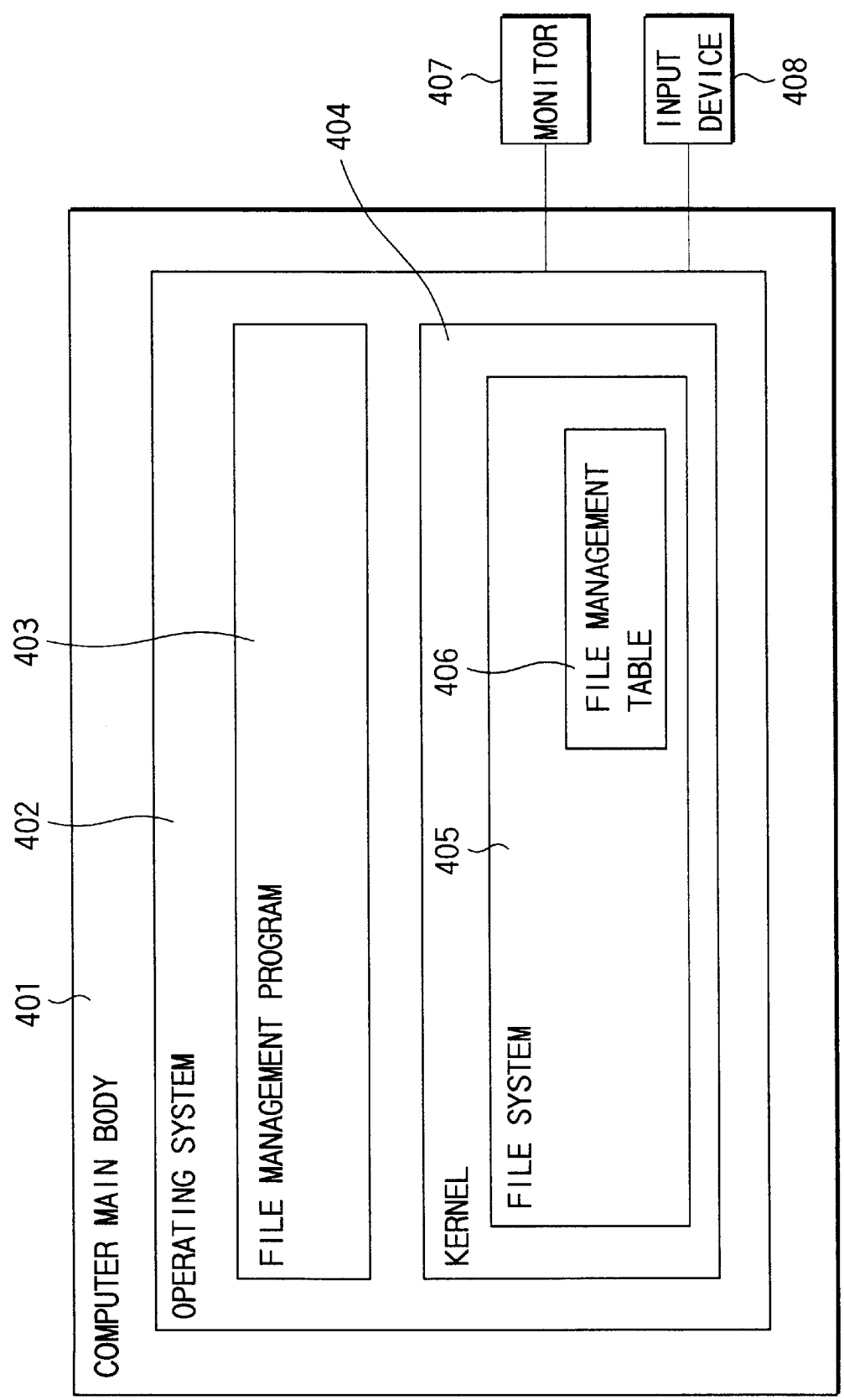
FIG. 10 is a block diagram which shows the function configuration of the file management system in the computer system according to the second embodiment of the present invention.

FIG. 10 is a block diagram which explains the function configuration of the file management system in the computer system according to the second embodiment.

In FIG. 10, input device 408, the keyboard, and the mouse, etc., and display monitor 407 are connected with the computer main bodies 401 such as PC servers and personal computers. For example, the magnetic disk unit (not shown in the figure) is included to the computer main body 401 as a recording device which records the file.

The reference numeral 404 indicates an operating system with the window display function as a GUI(graphical user interface). File system 405 is installed to manage the record and the reproduction of the file To kernel 404 of this operating system 402 for the magnetic disk unit (not show in the figure) of this computer system. File management table 406, which records the position etc. where the file is recorded, is installed in this file system 405 to manage the file at file recording device of magnetic disk unit etc. This file management table 406 is called the file allocation table and mastering file table, etc. in general, the structure is known in general already widely, and a detailed explanation is omitted. File system 405 hierarchically manages the files by using file management table 406.

The reference numeral 403 indicates a file management application program from which the operation is started by the user, and, in general, it is called the file manager and the explorer. The retrieval function of the file is installed in this file management application program 403. This file retrieval function presents the position (path information) where the file, which the user is looking for by specifying the file name and the date which the file is recorded and the text, etc. included in the file for a retrieval condition, is recorded.

Figure 12:
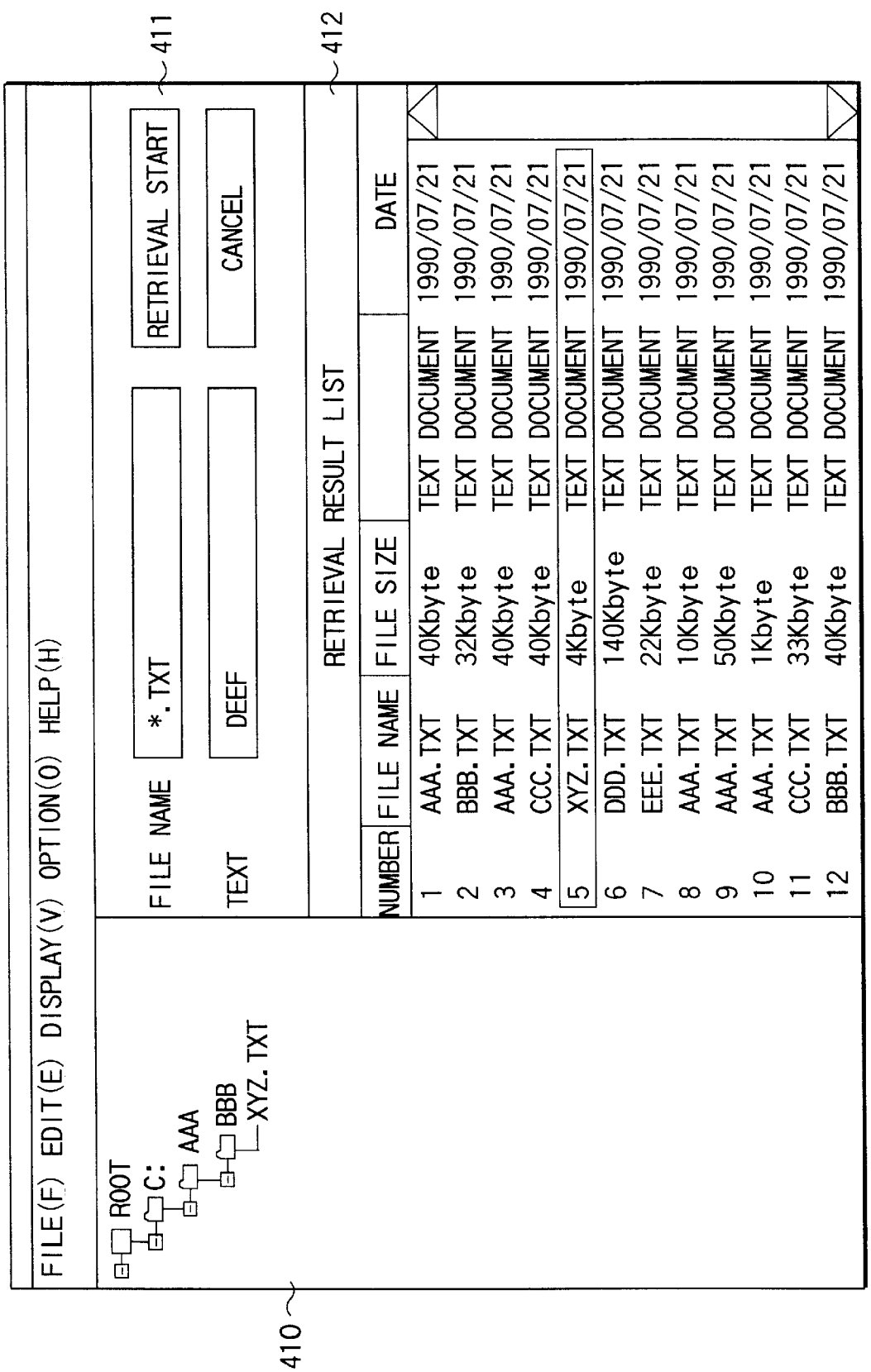
FIG. 12 is a figure which shows an example of the display screen used by the retrieval processing of the file management system according to the second embodiment.

The state that this file management application program 403 is started, and the screen of the file retrieval function is displayed in display monitor 407 is shown in FIG. 12. This screen is constructed by retrieval information input area 411, retrieval result list display area 412, and tree display area 410. The area where the file name which is the retrieval condition is input, the area where the text is input, the button which specifies the retrieval starting, and the button, which specifies the cancel of the retrieval, are displayed in retrieval information input area 411. Retrieval result list display area 412 is an area where the hit file, as a result of the retrieval, is having a look displayed, and the one to display the update date of the sequence number, the file name, the size of the file, the file type, and the file of the hit file. Path information, which shows the record position in the file recording device of the file, is hierarchically displayed about the file selected with the mouse among hit files that the list display is done in retrieval result list display area 412, in tree display area 410.

Figure 11:
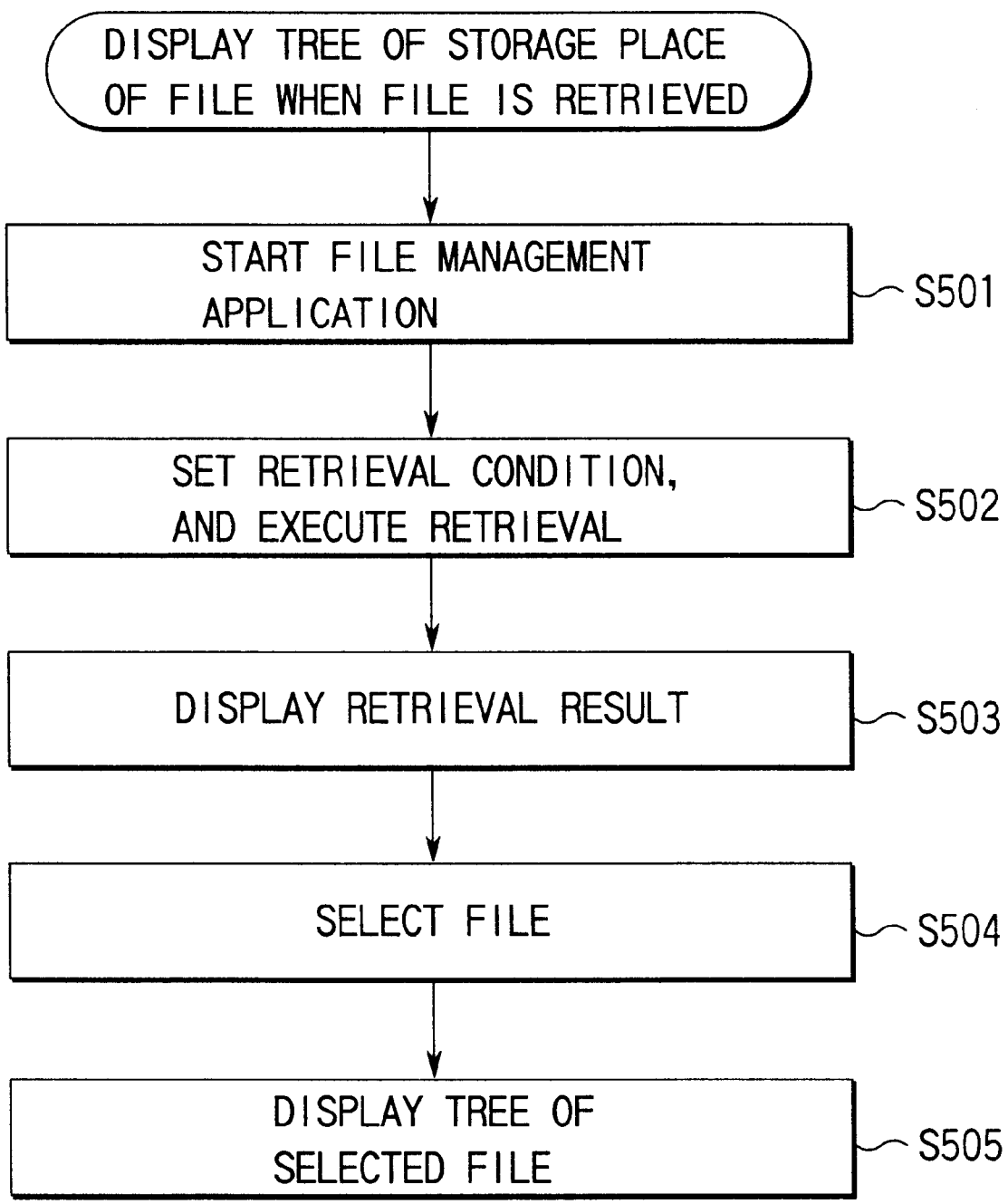
FIG. 11 is a flowchart which shows the procedure of the tree display processing of the retrieval result executed by the file management system according to the second embodiment.

The file, which the user is looking for, is retrieved as follows by the use of the file retrieval function of file management application program 403, path information on the file is explained, and the operation explanation when the tree is displayed (hierarchical structure display) will be explained by using the flowchart of FIG. 11.

First, the user starts file management application program 403 with an input device (step S501). When this program starts, the screen shown in FIG. 12 is displayed in display monitor 407.

Next, the retrieval condition of the file recording device is input to the area of the input of retrieval information on the display screen. The state that "*.TXT" is specified for a file name and "DEEF" is specified for text information is shown in FIG. 12 as a retrieval condition. When the retrieval condition is input like this, the retrieval of the file is executed by selecting the retrieval starting button the with mouse (step S502).

File management application program 403 passes the specified retrieval condition to file system 405 and requests the retrieval of the file when the retrieval of this file is directed. File system 405 passes information on the file which coincides with the retrieval condition (path information etc. on the file name and the file) referring to file management table 406 based on the condition specified from file management application program 403 to file management application program 403. File management application program 403 displays file information which is retrieval result received from file system 405 to retrieval result list display area 412. FIG. 12 shows the case where a part of the retrieval result is displayed in retrieval result list display area 412 as this retrieval result. To display other retrieval results, the display becomes possible by clicking the arrow button shown at the right of retrieval result list display area 412 with the mouse and making the screen scrolled (step S503).

Next, the desired file is selected with the mouse from among the retrieval result of the display in retrieval result list display area 412. In FIG. 12, the state that the file of file name "XYZ.TXT" of sequence number 5 is selected is shown in the figure (step S504).

When the file is selected like this, file management application program 403 displays path information which indicates the position where the selected file is stored in the tree (hierarchical structure display). The position where the file of this selected file name "XYZ.TXT" is stored is displayed in tree form in tree display area 410 of FIG. 12. That is, the file of selected file name "XYZ.TXT" to be recorded in the folder of the name called as BBB which is installed in the folder of the name called as AAA installed under C drive and to be managed is shown in the figure. When path information, which displays in tree form, is shown in the text, it becomes "C:\AAA\BBB\XYZ.TXT". (On the computer which uses the operating system of an English display, the sign: back-slash "\" is used instead of sign "¥")

As mentioned above, the user comes to be able to visually confirm path information which shows the position where the necessary file is stored from among the files managed by the hierarchical structure by displaying the hierarchical structure of the file selected from the result of doing the file retrieval in tree form. The storage position can be recognized intuitively and more in detail compared with displaying path information in the text according to the present invention. The present invention has a larger effect to recognize the storage position, especially, when the target file is stored in the folder allocated at a hierarchical deep position of lower level of the hierarchical structure.

In the hierarchical structure display method according to the second embodiment, it is also possible to store and distribute a computer program in which the procedure therefor is included to a computer readable storage medium.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic filing system, which manages files in a hierarchical management system, comprising:

first storage means for storing one or more image data files for a page unit;

second storage means separate from the first storage means for storing a page management table and retrieval text data, said page management table including at least a cabinet name, a folder name, a document name, a page name, a retrieval keyword, and a storage position in said first storage means to manage said one or more image data files according to the hierarchical management system;

retrieval display means for retrieving at least one of said retrieval keyword and said retrieval text data stored in said second storage means based on a specified retrieval condition, and displaying one or more file names of said one or more image data files which match said retrieval condition;

file selection input means for selecting and inputting a file name from said one or more file names; and hierarchy display means for displaying a cabinet name, a folder name, a document name, and a page name of an image data file based on said selected and input file name, referring to said page management table in a tree form.

2. The system according to claim 1, wherein said second storage means stores a document management table, a folder management table and a cabinet management table;

said document management table includes said cabinet name, said folder name and said document name based on said selected and input file name;

said folder management table includes at least said cabinet name and said folder name based on said selected and input file name; and said cabinet management table includes at least said cabinet name based on said selected and input file name.

3. The system according to claim 1, wherein an input area for said retrieval condition, a list display area for a retrieval result displayed by said retrieval display means, and a tree display area displayed by said hierarchy display means are displayed on the same screen.

4. A hierarchical structure display method adapted to an electronic filing system which manages files in a hierarchical management system, comprising:

storing one or more image data files in a first storage means for a page unit;

storing a page management table and retrieval text data in a second storage means separate from the first storage means, said page management table including at least a cabinet name, a folder name, a document name, a page name, a retrieval keyword, and a storage position in said first storage means to manage said one or more image data files according to said hierarchical management system;

retrieving at least one of said retrieval keyword and said retrieval text data stored in said second storage means based on a specified retrieval condition, and displaying one or more file names of said one or more image data files which match said retrieval condition;

selecting and inputting a file name from said one or more file names; and displaying a cabinet name, a folder name, a document name, and a page name of an image data file based on said selected and input file name, referring to said page management table in a tree form.

5. A file management system which manages files in a hierarchical management system, comprising:

a file system which stores one or more image data files for a page unit;

a file management table which stores a page management table and retrieval text data, said page management table including at least a cabinet name, a folder name, a document name, a page name, a retrieval keyword, and a storage position in said first storage means to manage said one or more image data files according to the hierarchical management system, wherein the page management table and retrieval text data are stored separately from the one or more image data files; and a file management application having a retrieval function for said one or more image files, wherein said file management application performs the steps of:

retrieving at least one of said retrieval keyword and said retrieval text data stored in said second storage means based on a specified retrieval condition, and displaying one or more file names of said one or more image data files which match said retrieval condition, selecting and inputting a file name from said one or more file names, and displaying a cabinet name, a folder name, a document name, and a page name of an image data file based on said selected and input file name, referring to said page management table in a tree form.

6. A computer readable recording medium storing an electronic filing program which manages files in a hierarchical management system, said program comprising:

storing one or more image data files in a first storage means for a page unit;

storing a page management table and retrieval text data in a second storage means separate from the first storage means, said page management table including at least a cabinet name, a folder name, a document name, a page name, a retrieval keyword, and a storage position in said first storage means to manage said one or more image data files according to the hierarchical management system;

retrieving at least one of said retrieval keyword and said retrieval text data stored in said second storage means based on a specified retrieval condition, and displaying one or more file names of said one or more image data files which match said retrieval condition;

selecting and inputting a file name from said one or more file names; and displaying a cabinet name, a folder name, a document name, and a page name of an image data file based on said selected and input file name, referring to said page management table in a tree form.

* * * * *